US011099159B2

(12) United States Patent
Tarafder et al.

(10) Patent No.: US 11,099,159 B2
(45) Date of Patent: Aug. 24, 2021

(54) SYSTEMS, METHODS AND DEVICES FOR REDUCING BAND DISPERSION IN CHROMATOGRAPHY

(71) Applicant: Waters Technologies Corporation, Milford, MA (US)

(72) Inventors: Abhijit Tarafder, Franklin, MA (US); Pamela C. Iraneta, Brighton, MA (US)

(73) Assignee: Waters Technologies Corporation, Milford, MA (US)

( * ) Notice: Subject to any disclaimer, the term of this patent is extended or adjusted under 35 U.S.C. 154(b) by 342 days.

(21) Appl. No.: 16/082,368

(22) PCT Filed: Mar. 7, 2017

(86) PCT No.: PCT/US2017/021107
§ 371 (c)(1),
(2) Date: Sep. 5, 2018

(87) PCT Pub. No.: WO2017/155959
PCT Pub. Date: Sep. 14, 2017

(65) Prior Publication Data
US 2020/0300820 A1    Sep. 24, 2020

Related U.S. Application Data

(60) Provisional application No. 62/304,460, filed on Mar. 7, 2016.

(51) Int. Cl.
*G01N 30/44* (2006.01)
*G01N 30/74* (2006.01)

(52) U.S. Cl.
CPC .............. *G01N 30/44* (2013.01); *G01N 30/74* (2013.01)

(58) Field of Classification Search
CPC ........ B01D 15/14; B01D 15/40; G01N 30/38; G01N 30/44; G01N 30/74; G01N 30/8658
See application file for complete search history.

(56) References Cited

U.S. PATENT DOCUMENTS 5,175,431 A     12/1992  Eisele et al.
5,827,945 A  *  10/1998  Arnold ................... G01N 30/16
                                                   73/23.42

(Continued)

FOREIGN PATENT DOCUMENTS

CN      1126628 A      7/1996
WO      9701755 A2     1/1997

(Continued)

OTHER PUBLICATIONS

Extended European Search Report issued in European Application No. 17763879.8 dated Feb. 21, 2020.

(Continued)

*Primary Examiner* — Francis C Gray
(74) *Attorney, Agent, or Firm* — Womble Bond Dickinson (US) LLP; Deborah M. Vernon; Benedict L. Hanrahan

(57) ABSTRACT

Reduced column loading of a sample onto a chromatographic column may be mitigated by excluding diffuse portions of the sample from introduction to the column. Systems and methods are provided for detecting and removing the diffuse portions from the feed solution delivered to the chromatography column. The systems and methods herein permit use of a single detector to detect and remove the diffuse portions and can accommodate a recovery/collection/recycling mechanism permitting reuse of removed sample from the diverted diffuse portions.

19 Claims, 7 Drawing Sheets

(56) References Cited

U.S. PATENT DOCUMENTS

| | | | |
|---|---|---|---|
| 6,344,172 B1 | 2/2002 | Afeyan et al. | |
| 6,502,448 B1* | 1/2003 | Rapkin | G01N 30/62 |
| | | | 210/198.2 |
| 6,987,565 B2* | 1/2006 | Hirahara | G01N 21/714 |
| | | | 356/316 |
| 2002/0139752 A1* | 10/2002 | Berger | B01D 15/40 |
| | | | 210/656 |
| 2006/0065189 A1* | 3/2006 | Babic | H01L 21/67034 |
| | | | 118/50 |
| 2008/0053908 A1* | 3/2008 | Chordia | B01D 15/165 |
| | | | 210/656 |
| 2015/0316516 A1 | 11/2015 | Albrecht, Jr. | |
| 2017/0284978 A1* | 10/2017 | Cardin | G01N 30/12 |
| 2018/0345175 A1* | 12/2018 | Schlake | G01N 30/32 |

FOREIGN PATENT DOCUMENTS

| | | |
|---|---|---|
| WO | 2012074481 A1 | 6/2012 |
| WO | 2015121425 A1 | 8/2015 |

OTHER PUBLICATIONS

Guiochon et al. "Fundamentals of Preparative and Nonlinear Chromatography." New York: Elsevier Academic Press. (Mar. 2006).

Wankat. "Large-Scale Adsorption and Chromatography." Boca Raton, FL: CRC Press, Inc. (Sep. 1986).

F. Kamarei, A. Tarafder, F. Gritti, P. Vajda, G. Guiochon, Journal of Chromatography A, vol. 1314, Nov. 1, 2013, pp. 276-287.

International Search Report and the Written Opinion from Corresponding PCT/US2017/021107; Completed on May 4, 2017; dated May 23, 2017.

G. Guiochon, A. Tarafder, Journal of Chromatography A, vol. 1218, Dec. 21, 2010, pp. 1037-1114.

M. Mishra, C. Rana, A. De Wit, M. Martin, Journal of Chromatography A, vol. 1297, Apr. 29, 2013, pp. 46-55.

A. Rajendran, Journal of Chromatography A, vol. 1250, May 16, 2012, pp. 227-249.

* cited by examiner

SYSTEMS, METHODS AND DEVICES FOR REDUCING BAND DISPERSION IN CHROMATOGRAPHY

CROSS-REFERENCE TO RELATED APPLICATIONS

This application is a National Stage Application of International Application No. PCT/US2017/021107, filed Mar. 7, 2017, which claims priority to and the benefit of U.S. Provisional Patent Application Ser. No. 62/304,460, filed Mar. 7, 2016, and entitled "Systems, Methods and Devices for Reducing Band Dispersion in Chromatography." Each of the foregoing applications is incorporated herein by reference in its entirety.

FIELD OF THE TECHNOLOGY

The present disclosure generally relates to chromatography systems, and in particular, systems, methods, and devices having sharp, non-diffuse sample bands for increased efficiency in a chromatography system, such as a highly compressible fluid chromatography system (e.g., carbon dioxide based chromatography system). In particular, the present disclosure can be useful in reducing band dispersion in chromatography systems.

BACKGROUND

Chromatography systems are used to separate a wide range of compounds for preparatory and analytical applications. Chromatography technologies include liquid chromatography (e.g., HPLC) and highly compressible fluid chromatography (e.g., supercritical fluid chromatography (SFC) or carbon dioxide based chromatography). Various modes of operating chromatography instruments are known. One such mode involves sample purification or capture onto the chromatographic column using a continuous sample pulse or injection. A continuous sample pulse in a chromatography separation refers to supplying, or continuously injecting onto the column, a sample for an extended period of time. It is contrasted to an injection point at a discrete time. The duration of a continuous sample pulse is substantial relative to the duration of the separation. A continuous sample pulse may, for example, continue to supply further sample to the column even as the separation proceeds. At times, a continuous sample pulse will exhibit an approximately constant concentration of sample throughout.

A continuous sample pulse may be used in a number of different preparatory and analytical chromatographic applications. For example, one particular type of chromatographic separation that utilizes a continuous sample pulse is known in the art as "on-off chromatography." On-off chromatography achieves a separation by retaining a compound or compounds within the chromatographic column while allowing another compound or compounds to elute, before washing out the column. See, e.g., Phillip C. Wankat, Large-Scale Adsorption and Chromatography (1986). On-off chromatography is particularly useful for preparatory separation, though analytical applications are significant as well, including determination of adsorption isotherms. See, e.g., Fahimeh Kamarei, Abhijit Tarafder, Fabrice Gritti, Peter Vajda, Georges Guiochon, Determination of the adsorption isotherm of the naproxen enantiomers on (S,S)-Whelk-O1 in supercritical fluid chromatography, J. Chromatogr. A. 2013 Sep. 2; 1314:276-287; G. Guichon, A Felinger, D Shirazi, and A Katti, Fundamentals of Preparative and Nonlinear Chromatography (2006).

In on-off chromatography, introducing the sample with a constant concentration throughout the continuous sample pulse can be desirable to improve the efficiency and quality of the separation. For example, FIG. 1 represents two different separations. Separation A exhibits a diffuse sample band, while Separation B exhibits a non-diffuse sample band having a constant concentration throughout the continuous sample pulse. Both separations show an inlet 110, a column 120, and an outlet 130 at Times 101, 102, 103, and 104. At Time 102, a diffuse sample band 140 is in inlet 110 of Separation A, and a non-diffuse band 150 is in inlet 110 of Separation B. At Time 103, the sample bands have migrated through the column at approximately the same rate, as depicted by the arrows at the sample band fronts. Time 104 represents the moment before breakthrough, when the sample bands are throughout both respective columns 120, but have not yet entered the respective outlets 130. At Time 104, the diffuse portion 170 remains in the diffuse band 140 of Separation A. As shown, at the time of breakthrough, the chromatography column used in Separation A is not optimally loaded by the sample band, due to the presence of diffuse portion 170.

SUMMARY

The present disclosure generally relates to chromatography systems, and in particular, systems, methods, and devices having sharp, non-diffuse sample bands for increased efficiency in a chromatography system, such as a highly compressible fluid chromatography system (e.g., carbon dioxide based chromatography system). The present disclosure can be useful in addressing the problem of diffuse sample bands in chromatography systems.

In one embodiment, the present disclosure relates to a chromatography method, such as for conducting on-off chromatography in a carbon dioxide based chromatography system. The method of this embodiment includes: directing a flow of a feed solution through a bypass line to a detector to divert a diffuse portion of the feed solution from flowing through a chromatography column, the feed solution comprising mobile phase, such as carbon dioxide and at least one co-solvent, and sample; observing an output of the detector, wherein the output indicates whether the sample is present in a non-diffuse concentration; and directing the flow of the feed solution through the chromatography column when the output indicates the non-diffuse concentration.

In this application, the term "mobile phase" is used to describe the primary source of a chromatographic flow stream including multiple components. For example, in a separation in which carbon dioxide ($CO_2$) and methanol (a co-solvent) are mixed together, the term mobile phase refers to the combination of $CO_2$ and methanol.

In another embodiment, the present disclosure relates to a chromatography method wherein the output of the detector indicates that the sample is present in a non-diffuse concentration when the output reaches a plateau. The bypass line can be a zero volume connector. The chromatography method can further include directing the flow from the chromatography column to the detector after the flow of the feed solution is directed to the chromatography column. It can also include recycling a portion of the feed solution that passed through the detector, wherein the mobile phase and sample from the diverted portion are recovered for use in a new portion of the feed solution.

In another embodiment, the present disclosure relates to a chromatography method including measuring the concentration of a sample in a feed solution to identify a non-diffuse portion of the feed solution, wherein the non-diffuse portion has a concentration of the sample that is approximately constant and non-zero; and directing the non-diffuse portion of the feed solution to a chromatography column.

In another embodiment, the present disclosure relates to a chromatography system including a mobile phase and sample flow stream; a valve downstream of the flow stream, wherein the valve is capable of changeably establishing a fluid path through either a chromatography column or a bypass line; a first detector in fluid communication with the bypass line and a second detector in fluid communication with the chromatography column; and a controller, wherein the controller receives the output of the first detector and controllably actuates the valve. The first and second detectors can be the same detector. The detector(s) may be any one of: a UV/VIS detector, an RI detector, a conductivity monitor, or a combination thereof.

In another embodiment, the present disclosure relates to a chromatography system wherein the controller is capable of identifying when the output of the first detector reaches a plateau and thereupon actuating the valve to direct the feed solution flow to the chromatography column. The controller can be capable of using the output of the first detector to actuate the valve so as to provide diffuse portions of a sample band to the bypass line and non-diffuse portions of a sample band to the chromatography column.

In another embodiment, the present disclosure relates to a chromatography system wherein the mobile phase comprises a compressible fluid (e.g., $CO_2$) and a co-solvent. The system further includes a mixer in fluid communication with the flow stream, a compressible fluid source in fluid communication with the mixer, a co-solvent source in fluid communication with the mixer and a co-solvent and sample source in fluid communication with the mixer. The chromatography system can further include a second valve upstream of the mixer, wherein the second valve can be capable of changeably establishing a fluid connection between either of the co-solvent source and the co-solvent and sample source and a pump, the pump being capable of pressuring a flow stream from either of the co-solvent source or the co-solvent and sample source to the mixer. The chromatography system can also include a recovery and recycling system downstream of the first detector, wherein the recovery and recycling system can be capable of returning the sample and co-solvent to the co-solvent and sample source.

The present disclosure provides a number of advantages. Embodiments of the present disclosure may increase the quality, speed, efficiency and/or capacity of the separation. In on-off chromatography separations, the present disclosure can improve the collection of a given amount of a desired compound(s) by requiring fewer cycles of loading and washing. Reducing the number of cycles can result in a substantial reduction in the amount of time required for the separation, can extend the life of the column, can reduce the amount of co-solvent and carbon dioxide required to perform the separation, and can achieve a more concentrated eluate. Reducing the amount of solvent can be both cost-effective and environmentally friendly.

BRIEF DESCRIPTION OF THE DRAWINGS

The invention will be more fully understood from the following detailed description taken in conjunction with the accompanying drawings, in which.

DETAILED DESCRIPTION

Figure 1:
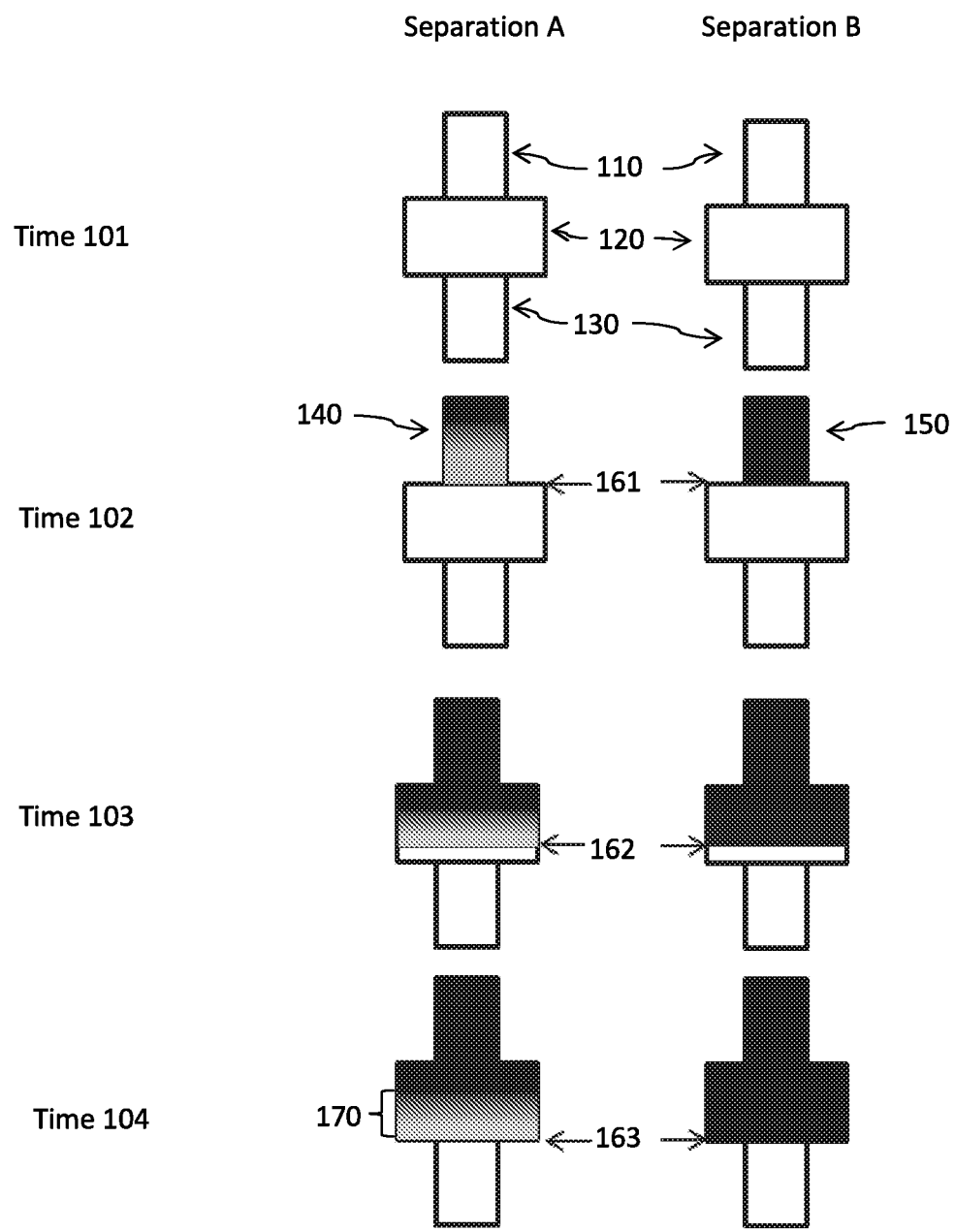
FIG. 1 shows an exemplary schematic illustrating Separation A having a diffuse sample band and Separation B having a non-diffuse sample band.

The present disclosure generally relates to chromatography systems, and in particular, systems, methods, and devices having sharp, non-diffuse sample bands for increased efficiency in a chromatography system, such as a carbon dioxide based chromatography system. In particular, the present disclosure can be useful in addressing the problem of diffuse sample bands in chromatography systems.

In one embodiment, the present disclosure relates to a chromatography method including directing a flow of a feed solution through a bypass line to a detector to divert a diffuse portion of the feed solution from flowing through a chromatography column, the feed solution including mobile phase and sample, observing an output of the detector, wherein the output indicates whether the sample is present in a non-diffuse concentration, and directing the flow of the feed solution through the chromatography column when the output indicates the non-diffuse concentration.

The present disclosure can be used with any chromatography system capable of performing sample purification or capture onto a chromatographic column using a continuous sample pulse or injection. The chromatography system can also be one having reduced column capacity due to introduction of a sample having a diffuse front. The chromatography systems can include liquid chromatography and highly compressible fluid chromatography (e.g., supercritical fluid chromatography or carbon dioxide based chromatography). In one embodiment, the chromatography system can be used for on-off chromatography.

The feed solution can be any solution containing one or more compounds of interest to be separated from the solution or other components in the solution. The one or more compounds of interest can be retained on the column to a greater degree than the solution or other components in the solution. For example, in an ideal case, the compounds of interest would not transfer from the stationary phase once held there, while the other components would not be retained at all by the stationary phase. Subsequently, changing the mobile phase would allow the compounds of interest to elute and be collected. Alternatively, the one or more compounds of interest can be retained on the column to a lesser degree than the solution or other components in the solution the compounds of interest are to be separated from.

The concentration of the one or more compounds of interest in the feed solution can be about 0.1 nM, 1 nM, 10 nM, 100 nM, 1 mM, 10 mM, 100 mM, 1 M, or about 10 M. These values can also be used to define a range, such as about 10 nM to about 10 mM.

The feed solution can include mobile phase (i.e., a primary source of a flow stream including multiple components). The mobile phase can be any mobile phase typically used in the chromatography systems. The mobile phase can include a compressible fluid, e.g., $CO_2$. The mobile phase in a carbon dioxide based chromatography system includes carbon dioxide. The mobile phase can further include one or more co-solvents. The amount of compressible fluid, e.g., carbon dioxide, compared to the amount of one or more co-solvents can be about, or greater than about, 5%, 10, 20, 30, 40, 50, 60, 70, 80, 90, 95 or about 100% of the mobile phase. These values can also be used to define a range, such as about 80% to about 95% of the mobile phase. The co-solvent can be selected from the group consisting of methanol, ethanol, isopropanol, acetonitrile, acetone, tetrahydrofuran, and mixtures thereof. In one embodiment, the co-solvent is methanol. Other co-solvent materials are possible.

In one embodiment, the feed solution can contain a reaction mixture wherein a reaction product is to be separated from the reaction mixture, reagents and other products. In another embodiment, the feed solution can contain a mixture where the relative amounts of various components differ substantially. For example, a mixture containing a trace contaminant to be separated and removed from a large quantity of desired product, or, alternatively, a mixture containing a desired product present in low concentration to be separated and recovered from a high concentration impurity.

The chromatography system can include a flow of a feed solution. In some embodiments, especially those involving analytical chromatography systems, the volumetric flow rate of the feed solution can be about 0.01 mL/min, 0.1 mL/min, 1 mL/min, or about 10 mL/min. In other embodiments, especially those involving preparatory chromatography systems, the range can extend to about 100 mL/min, 500 mL/min, 1000 mL/min, or more. These values can also be used to define a range, such as about 0.1 mL/min to about 1 mL/min.

The system can include a bypass line through which the feed solution flow is passed to divert a diffuse portion of the feed solution. The bypass line can be any bypass line capable of diverting the feed solution flow from the column to the detector in a relatively short time and using a relatively small volume. In certain embodiments, the bypass line is designed to divert feed solution in a manner which takes the least amount of time and uses the least amount of volume as commercially practicable. The bypass line can be a short section of tubing, or a valve used to switch the feed solution between the column, and the detector. The length of the bypass line can be about 1 cm, 5 cm, 10 cm, or about 50 cm. These values can also be used to define a range, such as about 1 cm to about 5 cm. The internal diameter of the bypass line can be the same or similar to the tubing containing the feed solution flow or the tubing from the feed solution flow to the column. The internal diameter of the bypass line can be about 0.001", 0.003", 0.005", 0.007", 0.009" or about 0.011". These values can also be used to define a range, such as about 0.005" to about 0.007".

In one embodiment, the bypass line is a zero volume connector or zero dead volume connector, such as a zero dead volume internal union, commercially available from the Valco Instruments Company and sold in connection with the name Valco®. The zero volume connector can permit rapid response by the detector and can decrease the amount of non-diffuse portion that needs be directed to the bypass before the passing of the diffuse front is recognized by the detector. The zero volume connector can be a connection which adds essentially no volume to the system.

The detector can be any detector capable of determining the presence of the retained compound(s) or component(s) in the chromatography system. In one embodiment, the detector can quickly determine the presence of the retained compound to allow for switching of the feed solution flow from the bypass line to the column. The detector(s) may be any one of: a UV/VIS detector, an RI detector, a conductivity monitor, or a combination thereof.

The diffuse portion of the feed solution is the leading edge, or in some embodiments the trailing edge, of the feed solution having a diluted concentration of the compound(s) of interest. The diffuse portion can be caused by band broadening effects throughout the chromatography system. The diffuse portion can be defined as any leading or trailing edge of a feed solution having less than about 99%, 98, 97, 96, 95, 94, 93, 92, 91, 90, 89, 88, 87, 86, 85, 84, 83, 82, 81, 80, 75, 70, 65, 60, 55 or about 50% of the overall concentration of the feed solution. In some embodiments, the diffuse portion can be lower than 50% of the overall concentration. That is, in some embodiments the leading or trailing edge has 45%, 40%, or 35% of the overall concentration. The distinction between a diffuse portion and a non-diffuse feed solution can vary depending on the chromatography system, the feed solution and other components and parameters. In another embodiment, a diffuse portion of the feed solution or diffuse sample front can be a sample front wherein the change in concentration from no concentration (baseline reading only) to the maximum concentration occurs over a significant period of time (or distance), e.g. more than 5 seconds, 10, 15, 20, 25, 30, 60, 90, 180, 360 seconds, or more. In some embodiments, the change in concentration may take a longer period of time, e.g., 5 minutes, 10 minutes, or about 12 minutes. A diffuse sample front is indicated by a shallow or slow gradient change between zero concentration and maximum concentration.

Any chromatography column can be any column capable of performing sample purification or capture from a continuous sample pulse or injection.

The feed solution flow can be directed through the bypass line to divert the diffuse portion of the feed solution from flowing through the chromatography column. For example, at the beginning of a new separation the feed solution can be directed through the bypass line until the non-diffuse feed solution is detected. The detector is used to observe or monitor the diffuse and non-diffuse nature of the feed solution. Once the output of the detector indicates the sample has a non-diffuse concentration, then the feed solution flow can be directed through the chromatography column.

In one embodiment, the indication by the detector output that the sample is present in the non-diffuse concentration can be when the output reaches a plateau. A plateau can occur when successive detector readings, such as at least 2, 3, 4, 5, 6, 7, 8, 9 or 10 readings are within 1%, 2%, 3%, 4% or 5% of each other, or the average of each.

After the flow of the feed solution has been directed to the chromatography column, the flow exiting the column can be directed to a detector. The detector used to monitor the diffuse portion of the feed solution from the bypass line and the detector used to monitor the flow exiting the column can be the same detector. The flow to the column is continued until the detector determines or observes breakthrough of the compound(s) to be retained on the column exiting the column. Breakthrough of the compound(s) can occur when the concentration of the compound(s) of interest eluting from the column reaches 0.1%, 0.2, 0.3, 0.4, 0.5, 0.6, 0.7, 0.8, 0.9, 1, 2, 3, 4 or about 5% of the non-diffuse concentration of the compound(s) of interest in the feed solution. Alternatively, breakthrough of the compound(s) can occur when the concentration of the compound(s) eluting from the column reaches 0.1%, 0.2, 0.3, 0.4, 0.5, 0.6, 0.7, 0.8, 0.9, 1, 2, 3, 4 or about 5% of the eluate.

The present disclosure provides systems, methods, and devices that can increase the amount of retained compound(s) which can be held within a column before breakthrough occurs. Reduced loading of the column can occur when the initial concentration of the retained compound introduced to the column within the sample band is less than the overall concentration of the retained compound within the sample band, which may occur when the sample band has a diffuse front. The diffuse portion may retain some or all of its dilute character while progressing through the column. The diffuse portion of the sample can, therefore, elute first and signal breakthrough even though the entire capacity of the column has not been utilized, thereby reducing the amount of compound loaded onto the column.

The systems, methods, and devices of the present disclosure can increase the amount of retained compound(s) of interest which can be held within a column before breakthrough occurs by about 5%, 10%, 15%, 20%, 25%, 30%, 35%, 40%, 45% or about 50% compared to systems, methods, and devices having samples bands with diffuse fronts. These values can also be used to define a range, such as about 10% to about 30%.

Figure 2:
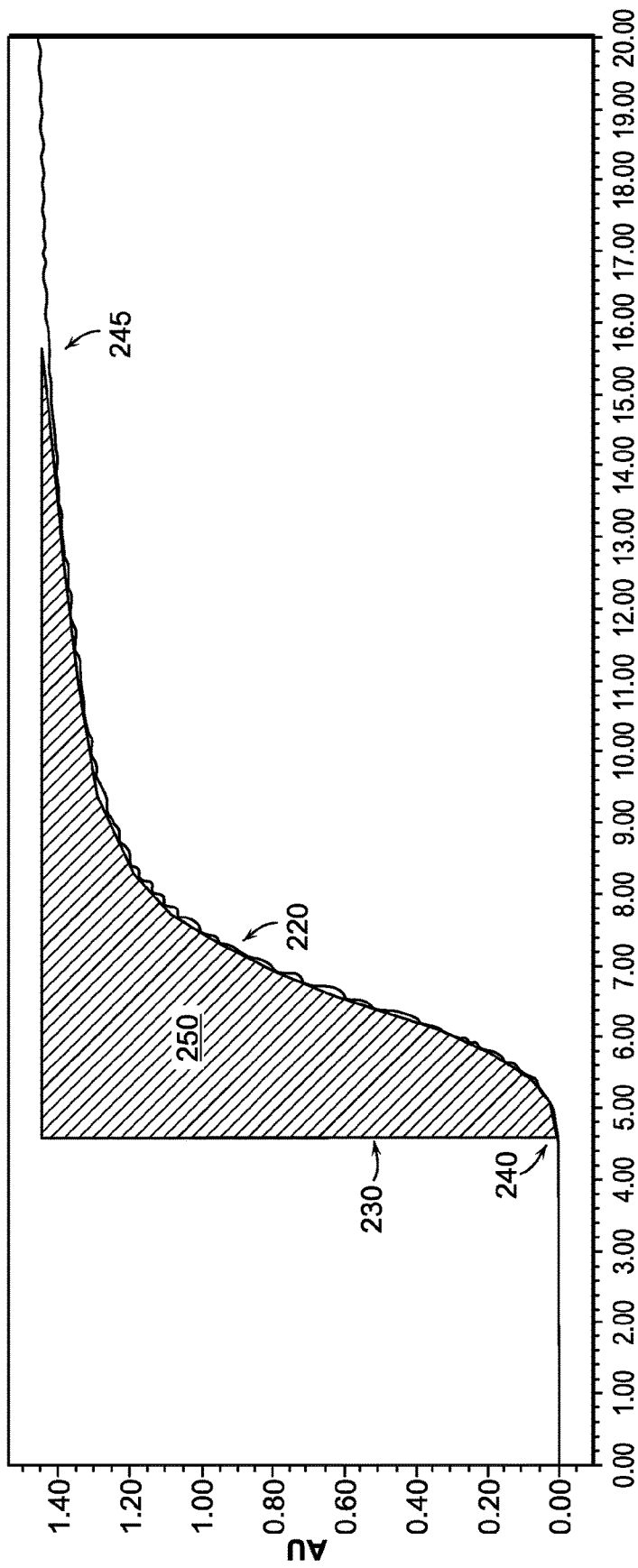
FIG. 2 shows an exemplary chromatogram featuring a diffuse front portion.

FIG. 2 shows an exemplary chromatogram with a diffuse front. Line 220 is the absorption reading from the detector. The reading is directly proportional to the sample concentration as it passes through the detector. Line 230 represents an ideal, non-diffuse feed solution having a slope approaching infinity in which absorbance increases from essentially zero to a maximum immediately. Point 240 indicates the beginning of the sample front. Point 245 indicates the point at which the absorbance reading reaches the maximum. The time between point 240 and point 245 indicates the period during which the diffuse front of the sample band passes through the detector. In a prior art system, this portion would normally be loaded onto the chromatography column. To determine whether or not the sample band front is diffuse, this area may be compared to the ideal non-diffuse front illustrated by line 230. The diffuse front is indicated by the long delay between sample detection at point 240 and the maximum absorbance at point 245, which here exceeds ten minutes. The shaded area 250 represents the amount by which loading of the compound(s) of interest is reduced by the presence of a diffuse front as compared to full loading of the column at the concentration of the non-diffuse portion.

As a result, the yield of desired compound is reduced. The separation may need to be repeated to obtain a satisfactory amount of the desired compound. As a percentage of the overall capacity of the column, the presence of a diffuse front can indicate breakthrough while the column only contains 50% or less of the overall capacity for the compound(s) of interest.

The systems, methods, and devices of the present disclosure can increase the amount of compound(s) retained before breakthrough, as a percentage of the overall capacity of the column, to an amount greater than about 50%, 55%, 60%, 65%, 70%, 75%, 80%, 85%, 90%, 95%, 97%, 98% or about 99% of the column's overall capacity. These values can also be used to define a range, such as about 90% to about 98%.

Figure 3:
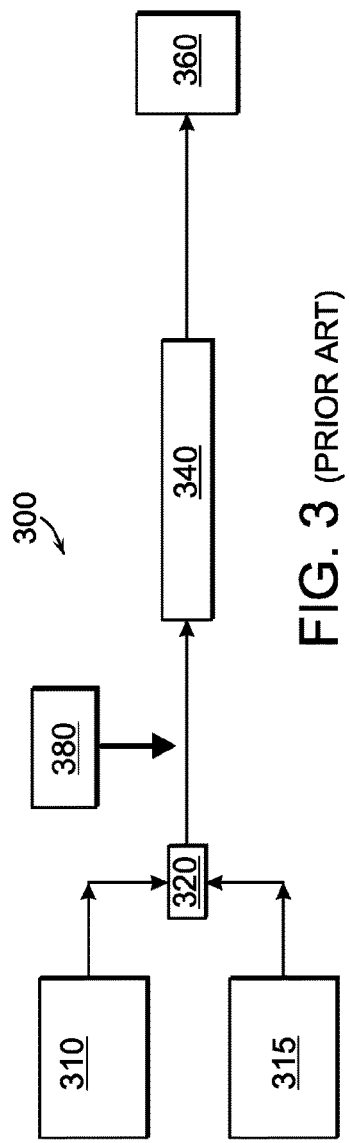
FIG. 3 shows an exemplary schematic illustrating a prior art chromatography system, wherein the sample injection occurs after a mixer.

FIG. 3 shows an exemplary chromatography system without a bypass line (Prior Art). The system includes a co-solvent source/pump 310, a carbon dioxide source/pump 315, and a mixer 320. The sample 380 can be diluted or mixed with co-solvent and is introduced into the system after the mixer 320. The sample introduction occurs within the pressurized carbon dioxide solution to create a feed solution flow. The feed solution flow is directed to the chromatography column 340. The separation occurs in chromatography column 340, after which detector 360 analyzes the resulting mixture or eluate.

Figure 4:
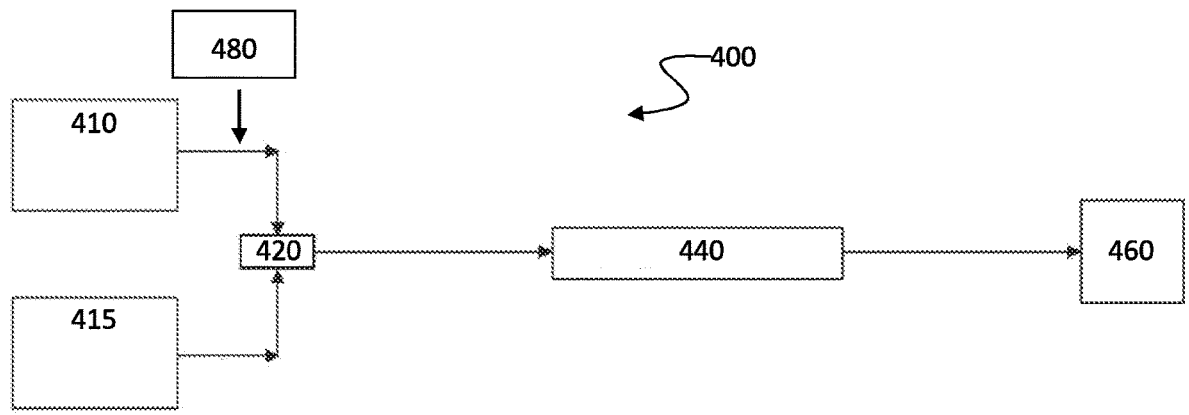
FIG. 4 shows an exemplary schematic illustrating another prior art chromatography system, wherein the sample injection occurs before a mixer.

FIG. 4 shows another exemplary chromatography system without a bypass line (Prior Art). The system includes a co-solvent source/pump 410, a carbon dioxide source/pump 415, and a mixer 420. The sample 480 can be diluted or mixed with co-solvent and is introduced into the system before the mixer 420. The sample introduction occurs within the pressurized co-solvent flow. A feed solution flow is created upon combination with the carbon dioxide at the mixer. The feed solution flow is directed to the chromatography column 440. The separation occurs in chromatography column 440, after which detector 460 analyzes the resulting mixture.

In some embodiments, the sample can be introduced to the system as a solute or suspension within a portion of the co-solvent. Diluting or mixing the sample with co-solvent can be done at standard temperature and pressures. In other embodiments, the sample can be introduced to the system as a solute or suspension within a portion of the compressible fluid (e.g., $CO_2$, Freon, etc.). The sample can be introduced while the compressible fluid is maintained at a particular temperature and pressure to remain a fluid. In one embodiment, the sample can be introduced using an extraction vessel.

Figure 5A:
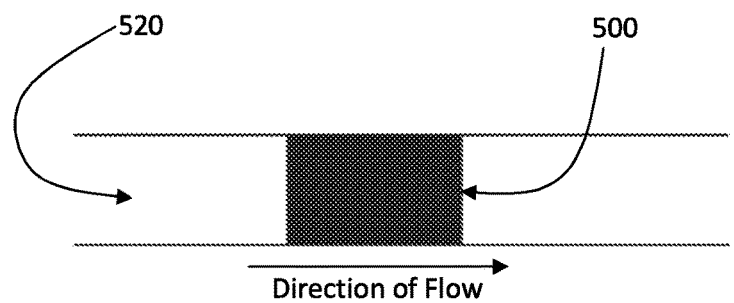
FIG. 5A shows an exemplary illustration of an ideal sample band.
Figure 5B:
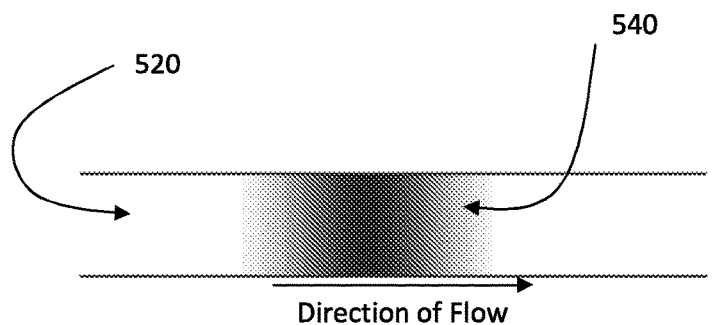
FIG. 5B shows an exemplary illustration of a diffused sample band.

A diffuse front in a feed solution flow can result from band broadening that occurs before the feed solution or sample band enters the column. Such band broadening can occur in any mobile phase, including an organic or aqueous mobile phase in a liquid chromatography system. Diffusion can be particularly acute in a highly-compressible fluid chromatography system (e.g., a carbon dioxide based chromatography system) because of the higher diffusivity of some analytes in compressible fluids, such as carbon dioxide. FIGS. 5A and 5B show exemplary illustrations of a diffuse front and back associated with band broadening. FIG. 5A shows a non-diffuse sample band 500 in conduit 520 after injection or introduction to the system. As the non-diffuse sample band 500 continues to move through conduit 520, it can become diffuse at the leading and/or trailing edges. FIG. 5B shows a diffuse sample band 540 in conduit 520.

Prior to introduction of the sample or feed solution, the chromatography system including bypass line, chromatography column, or both can be washed or cleaned by flowing only mobile phase through the system without sample.

Figure 6:
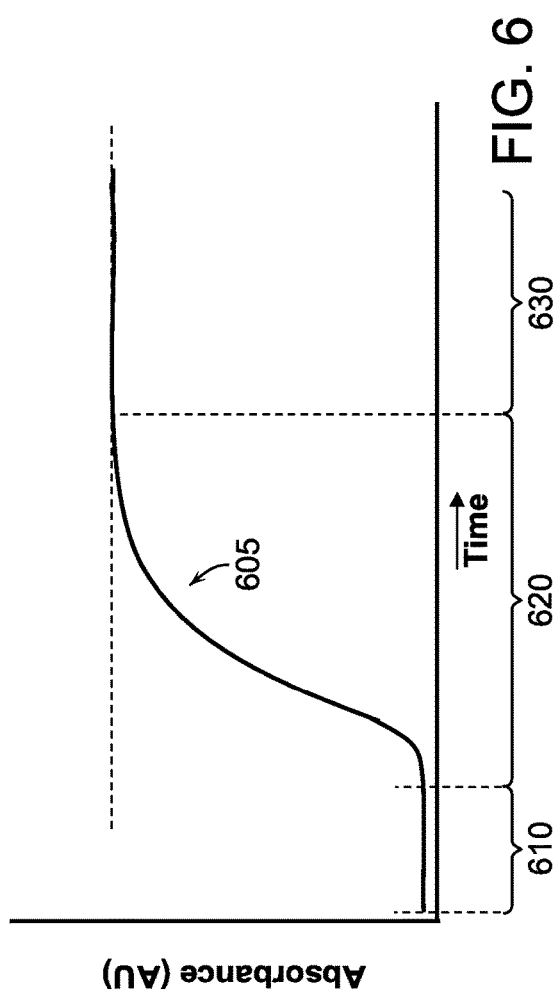
FIG. 6 shows an exemplary chromatogram featuring a diffuse sample front passing through a detector.

FIG. 6 shows an exemplary chromatogram with a diffuse front. Zone 610 shows a low signal constituting a baseline measurement and indicating no identifiable concentration of sample has reached the detector. Zone 620 shows the period of time over which the concentration of sample increases to a maximum value. The diffuse front is passing through the detector. Zone 630 shows the period of time during which the concentration continues at approximately the maximum value, i.e., a plateau. In an efficient separation, Zone 620 would be infinitesimally small, such that when a completely non-diffuse sample band arrives at the detector, the concentration would increase from 0 to the maximum. In most chromatography systems, some period resembling Zone 620 occurs.

In some embodiments, the initial detector output is not directly proportional to concentration. A calculation can be used or made to return an output that is proportional. For example, in the use of an ultraviolet detector that reports transmittance as an initial detector output, the transmittance measure may not be directly proportional to concentration. Absorbance values can be calculated from the transmittance values to provide a directly proportional output.

The flow stream can be switched from the bypass line to the column prior to reaching a plateau. The flow stream can be switched in anticipation of the plateau. For example, the approach of the plateau can be monitored by the steepness of the curve. As the slope of the line approaches zero (or is a substantially constant value near zero, or exhibits small variations about zero) the output value can be considered as reaching a plateau or a constant value and the flow stream can be switched. The slope of the signal of the diffuse section as it approaches the plateau can be about 0.2, 0.19, 0.18, 0.17, 0.16, 0.15, 0.14, 0.13, 0.12, 0.11, 0.1, 0.09, 0.08, 0.07, 0.06, 0.05, 0.04, 0.03, 0.02 or 0.01 and the flow stream can be switched. These values can also be used to define a range, such as about 0.1 to about 0.01.

The method can further include recycling a portion of the feed solution that passes through the detector, wherein co-solvent and sample from the portion are recovered for use in a new portion of the feed solution. The portion of feed solution that passes through the bypass line and detector can be recovered as opposed to being directed to waste. A recovery system can be particularly effective in a highly compressible fluid system, such as a carbon dioxide based system, because the fluid can be removed from the feed solution by applying standard temperature and pressure. Once the compressible fluid has been removed or flashed off, the remaining co-solvent and sample can be returned to the original co-solvent with sample source and loaded back onto the system. A recovery feature can be desirable in preparatory applications in which the supply of sample is limited relative to the amount of compound desired.

In another embodiment, the present disclosure relates to a chromatography method. The method includes: measuring the concentration of a sample in a feed solution to identify a non-diffuse portion of the feed solution, wherein the non-diffuse portion has a concentration that is approximately constant and non-zero; and directing the non-diffuse portion of the feed solution to a chromatography column. A concentration that is approximately constant is one that has, or has about, reached a plateau. A non-zero concentration is a concentration that is above the baseline and that indicates either a diffuse or non-diffuse portion of the feed solution is present in the detector.

In another embodiment, the present disclosure relates to a chromatography system including a mobile phase and sample flow stream; a valve downstream of the flow stream, wherein the valve is capable of changeably establishing a fluid path through either a chromatography column or a bypass line; a first detector in fluid communication with the bypass line and a second detector in fluid communication with the chromatography column; and a controller, wherein the controller receives the output of the first detector and controllably actuates the valve. The mobile phase can include a compressible fluid and a co-solvent and the system can further include a mixer in fluid communication with the flow stream, a compressible fluid source in fluid communication with the mixer, a co-solvent source in fluid communication with the mixer and a co-solvent and sample source in fluid communication with the mixer. The system can further include a second valve upstream of the mixer, wherein the second valve can be capable of changeably establishing a fluid connection between either of the co-solvent source and the co-solvent and sample source and a pump, the pump being capable of pressurizing a flow stream from either of the first co-solvent source or the co-solvent and sample source to the mixer. The use of a second valve and a pump can allow the co-solvent and co-solvent with sample source to both be reservoirs without their own dedicated pressurization sources. The pump can provide pressurization of a flow stream from either the co-solvent or the co-solvent and sample source as provided by the orientation of the valve.

The valves can be any valve for use in a chromatography system that can changeably establish a fluid path between at least two different paths. In one embodiment, the valve is a zero volume valve. The valve can be a multi-port rotary shear seal valve having a plurality of fluidic ports and one or more flow-through conduits. The valve can also be a slider valve, solenoid, pin valve, etc. Where the valve is a multi-port rotary shear seal valve, each flow-through conduit can provide a pathway between a pair of neighboring fluidic ports. When the valve rotates, its flow-through conduits move clockwise or counterclockwise depending upon the valve's direction of rotation. This movement operates to switch the flow-through conduit to a different pairing of neighboring fluidic ports, establishing a fluidic pathway between that different pair while removing the pathway from the previously connected pair of fluidic ports.

The controller can be any controller capable of receiving an output from a detector, determining the pre-set condition of the output (e.g., the reaching of a plateau, slope value, etc.) and controllably actuating the valve. In one embodiment, the controller can be capable of identifying when the output of the first detector reaches a plateau and thereupon actuating the valve to direct the feed solution flow to the chromatography column. In another embodiment, the controller can be capable of using the output of the first detector to actuate the valve so as to provide diffuse portions of a sample band to the bypass line and non-diffuse portions of a sample band to the chromatography column.

The controller can perform calculations necessary to convert the output of the detector into a measurement directly proportional to the sample concentration. As such, the controller can identify diffuse and non-diffuse portions within the feed sample. For example, the controller can perform calculations to identify a plateau. These calculations may include determining the steepness of the curve, for example, a plateau may be indicated by a value of 0.2, 0.19, 0.18, 0.17, 0.16, 0.15, 0.14, 0.13, 0.12, 0.11, 0.1, 0.09, 0.08, 0.07, 0.06, 0.05, 0.04, 0.03, 0.02 or 0.01. Additionally, the calculation may include a determination of whether the steepness has decreased to a certain degree indicated by its derivative (i.e., the second derivative of the curve). Additionally, the calculation may require that the second derivate be negative as the first derivative approaches 0 to ensure a plateau, as opposed to an initial period of low concentration before the non-diffuse portion is reported. In another calculation, the output value may be approached within a certain percentage of an anticipated value. For example, within 99%, 98, 97, 96, 95, 94, 93, 92, 91, 90, 85, 80 or about 75% of the anticipated value. The controller can also actuate the valve so that diffuse portions are delivered to the bypass line and non-diffuse portions are delivered to the chromatography column.

Figure 8A:
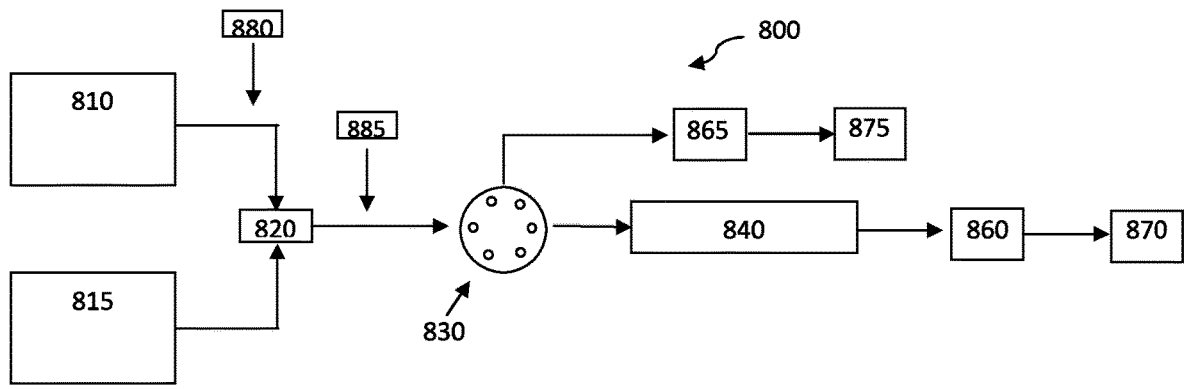
FIG. 8A shows an exemplary schematic illustrating a chromatography system with a bypass line according to an embodiment of the present disclosure.

FIG. 8A shows an exemplary schematic illustrating a chromatography system with a bypass line. The system includes a co-solvent source 810 in fluid communication with mixer 820. The system include a carbon dioxide source 815 in fluid connection with the mixer 820. Mixer 820 provides mobile phase to valve 830. The sample is introduced in the mobile phase to form a feed solution upstream of valve 830. The sample can be introduced at injection point 880 which adds the sample to the co-solvent. The sample can also be introduced at injection point 885 which adds the sample after the mixer 820 but before valve 830. At injection point 885, sample is added to the mobile phase flow.

Valve 830 can be a multi-port rotary shear seal valve having a plurality of fluidic ports and one of more flow-through conduits. Valve 830 can also be a slider valve, solenoid, pin valve, etc. Each flow-through conduit can provide a pathway between a pair of neighboring fluidic ports. When the valve rotates, its flow-through conduits move clockwise or counterclockwise depending upon the valve's direction of rotation. This movement operates to switch the flow-through conduit to a different pairing of neighboring fluidic ports, establishing a fluidic pathway between that different pair while removing the pathway from the previously connected pair of fluidic ports.

Valve 830 can controllably direct fluid flow to either detector 865 or chromatography column 840. In initial operation, valve 830 can direct the fluid flow to detector 865. When the measurements of detector 865 indicate that the diffuse front has passed the valve, valve 830 can be actuated to deliver the non-diffuse sample to chromatography column 840. Downstream of chromatography column 840 is detector 860. Downstream of both detector 865 and detector 860 are waste or optional recovery/collection/recycling mechanisms 875 and 870, respectively.

Figure 8B:
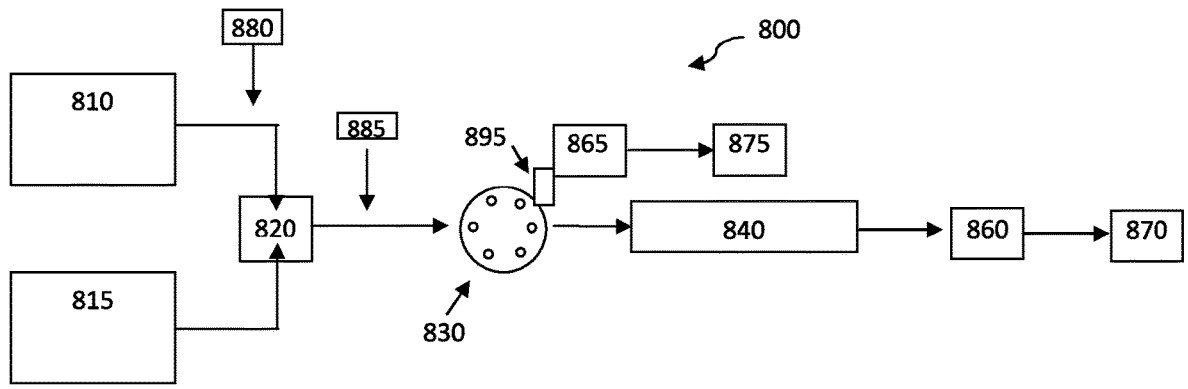
FIG. 8B shows an exemplary schematic illustrating a chromatography system with a zero volume connector bypass line according to an embodiment of the present disclosure.

FIG. 8B shows an exemplary schematic illustrating a chromatography system with zero volume connector 895 serving as the bypass line from valve 830 to detector 865. The other elements of the system are the same as in FIG. 8A. Zero volume connector 895 may permit direct connection between an outlet of valve 830 and an inlet of detector 865. In other embodiments, a valve may be configured to be in direct fluid communication with a detector.

Figure 9:
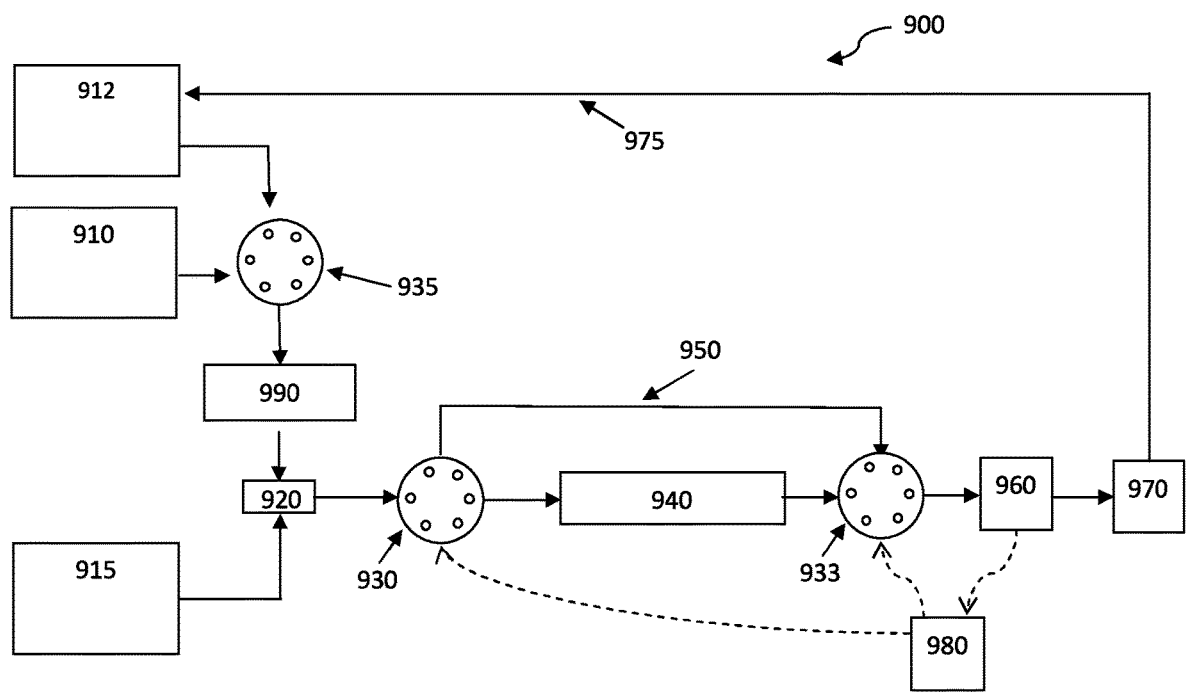
FIG. 9 shows an exemplary schematic illustrating a chromatography system with various optional features according to an embodiment of the present disclosure.

FIG. 9 shows an exemplary schematic illustrating a chromatography system with various optional features. In chromatography system 900, the sample is delivered by means of co-solvent and sample source 912. The system includes co-solvent and sample source 912 in fluid communication with valve 935. The system also includes co-solvent source 910, which can provide pure co-solvent without sample, in communication with valve 935. Pump 990 is located downstream of valve 935. Co-solvent with sample source 912 and co-solvent source 910 can be reservoirs and pump 990 can provide the pressurization necessary to provide a flow stream of co-solvent or co-solvent within the system. Alternatively, co-solvent with sample source 912 and co-solvent source 910 may be individually pressurized.

Co-solvent, co-solvent with sample, or both can be provided to mixer 920. The system includes a carbon dioxide source 915 in fluid connection with the mixer 920. To introduce a sample, carbon dioxide and co-solvent with sample can be mixed by mixer 920 to constitute a feed solution. The feed solution can be provided to valve 930. Valve 930 can be actuated to deliver to feed solution either to bypass line 950 or to chromatography column 940. Downstream of bypass line 950 and chromatography column 940 is valve 933. Valve 933 may be actuated to establish liquid communication either between bypass line 950 and detector 960 or between chromatography column 940 and detector 960. Chromatography system 900 utilizes only a single detector, i.e., 960, to measure output from either the bypass line 950 or the chromatography column 940. Downstream of detector 960 can be recovery system 970. Recovery system 970 can be used to remove carbon dioxide from the feed solution and recycle the remaining co-solvent with sample back to the co-solvent with sample source 912 via line 975. Valves 930, 933, and 935 can be a multi-port rotary shear seal valve having a plurality of fluidic ports and one of more flow-through conduits.

Chromatography system 900 can also include controller 980. Controller 980 can receive the output of detector 960 and actuate valves 930 and 933. Controller 980 can initially deploy valve 930 and valve 933 to establish a flow stream first through bypass line 950 and detector 960 and then through chromatography column 940 and detector 960. When the feed solution is introduced to mixer 920 by the action of valve 935, valve 930 can be deployed to deliver the feed solution to detector 960 through bypass line 950. Thereafter, controller 980 can monitor the output of detector 960. Upon observing a plateau, controller 980 can actuate valve 930 and valve 933 to establish a flow stream through column 940 to detector 960.

Bypass line 950 can be a zero volume connector (ZVC). A zero volume connector can permit rapid response by the detector and decrease the amount of non-diffuse portion that need be directed to the bypass before the passing of the diffuse front is recognized by the detector.

Figure 10:
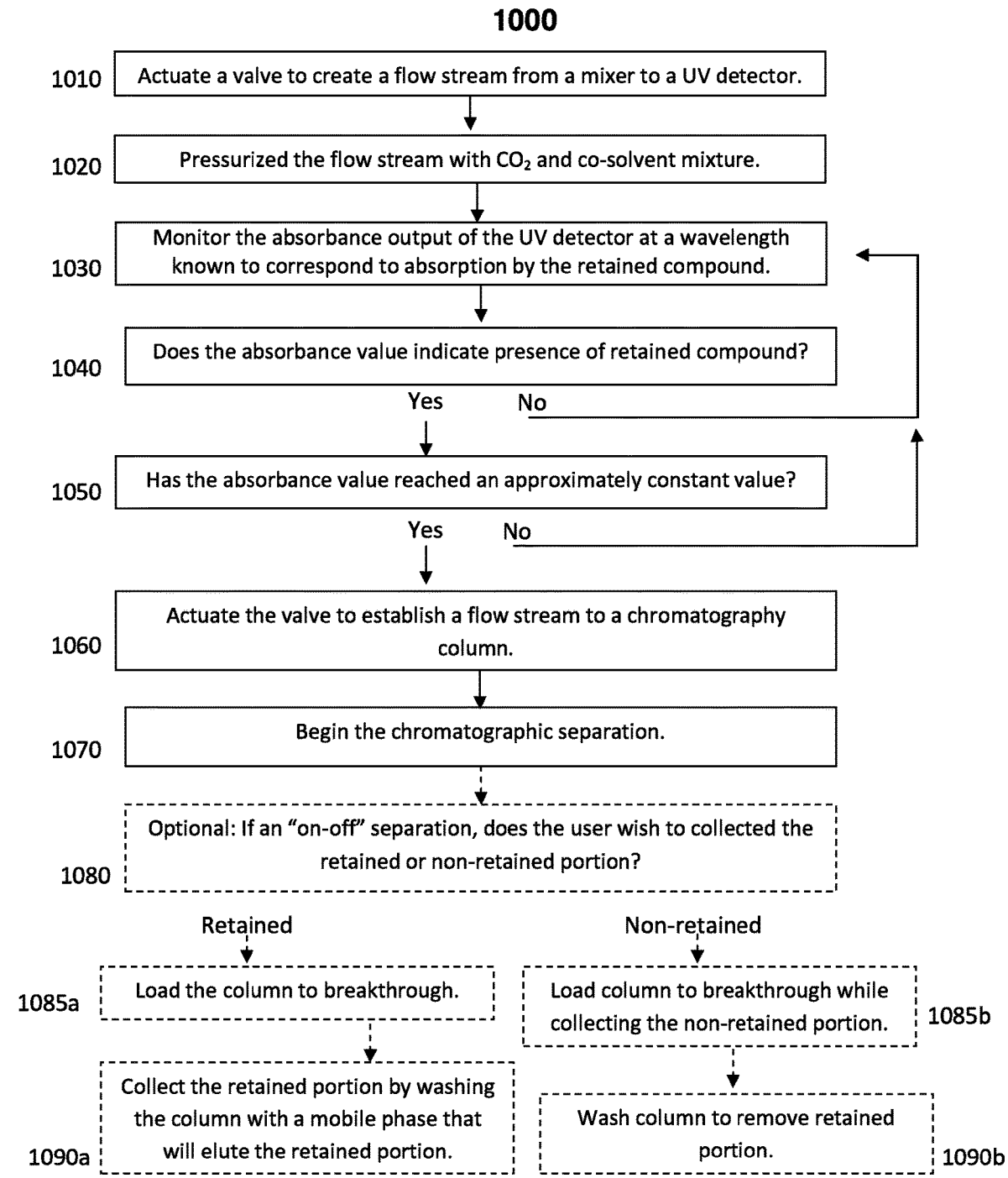
FIG. 10 shows an exemplary schematic illustrating a method for the operation of a chromatographic system according to an embodiment of the present disclosure.

FIG. 10 shows an exemplary flow chart listing steps by which an embodiment of the present technology, method 1000, can be operated. Step 1010 provides that a valve can be actuated to establish a flow stream to an ultraviolet detector. The valve can correspond to valve 830 of FIG. 8A or FIG. 8B or valve 930 of FIG. 9. The detector can correspond to detector 865 of FIG. 8A or FIG. 8B or detector 960 of FIG. 9. In one embodiment, the detector(s) are nondestructive and permit the recycling and reuse of the feed solution.

Step 1020 provides a pressurized flow stream with carbon dioxide and a co-solvent. The pressurization can be accomplished, for example, by a pump. The pump can correspond to pump 990 of FIG. 9. Step 1030 provides for monitoring the absorbance output of the ultraviolet detector at a wavelength corresponding to absorption by the compound(s) of interest.

Step 1040 provides for a determination of whether the absorbance value indicates the presence of compound(s) of interest. If the detector indicates no presence of the compound(s) of interest, such as before the sample band reaches the detector, the output of the detector continues to be monitored. If the detector indicates the presence of the compound(s) of interest, then method 1000 proceeds to Step

1050. Step 1050 provides continued observation of the output to permit for a determination of whether the absorbance value observed reaches an approximately constant value (e.g., a plateau). This constant value can represent a plateau in that it is elevated above the baseline. The observation of a plateau can indicate that the non-diffuse portion of the sample band has reached the detector.

Step 1060 provides for actuating the valve to establish the flow stream to the chromatography column. The diffuse portion of the feed solution has passed through the bypass line. Actuating the valve introduces non-diffuse feed solution to the column. Delivering the non-diffuse sample band to the chromatography column begins the chromatographic separation, i.e. Step 1070. In the case of on-off chromatography, the retained compound will begin to load onto the chromatography column.

Steps 1080 through 1090 are optional steps that may be applied to an on-off type separation. Step 1080 asks whether the retained portion or the non-retained portion is to be collected. The retained portion may be the compound(s) that constitute the smaller portion of the sample, permitting more sample collection before column washing. Alternatively, the retained portion may be the compound(s) that constitute the larger portion of the sample, for example if the relative retention of the compounds suggests a better separation may be achieved by retaining those compounds. When the retained portion is to be collected, Step 1085*a* loads the column until breakthrough while directing the eluted portion to waste. Step 1090*a* collects the retained portion by washing the column with a mobile phase that will elute the retained portion, i.e. a mobile phase for which the retained portion has a high affinity. When the non-retained portion is to be collected, Step 1085*b* loads the column until breakthrough while collecting the non-retained portion. Step 1090*b* washed the column to remove the retained portion. A mobile phase for which the retained portion has a high affinity may be used to draw the retained portion from the stationary phase and to waste.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Example. It should be understood that these Examples, while indicating preferred embodiments of the invention, are given by way of illustration only.

EXAMPLE

Example 1

A chromatographic separation was conducted with and without the bypass line using the methodology of the present disclosure. The separation was conducted using a Waters TharSFC Method Station equipped with a silica 2EP column (5 μm, 4.6×150 mm), commercially available from Waters Technology Corporation and sold in connection with the name Viridis®. A 15 g/L imidazole sample solution in methanol was used.

Initially, a regeneration step was performed by pumping mobile phase through the bypass line and detector, and the chromatographic column and detector. The regeneration step was performed to wash any contaminates from the system and prepare the column for the separation. The regeneration step was conducted with a 90% $CO_2$ to 10% methanol (vol/vol) solution at 40° C. The pressure at the automatic back pressure regulator (ABPR) was set to 2175 psi (15 MPa).

After the regeneration step, the flow stream was directed through the bypass line's zero volume connector. The feed solution was then introduced to the system. The feed solution was introduced by pumping the imidazole solution 3 mL/min. At the mixer, the imidazole solution and carbon dioxide were mixed at a 10% imidazole solution to 90% carbon dioxide ratio. The pressure at the ABPR was set to 2175 psi (15 MPa), and the column was maintained at 40° C.

The feed solution was initially introduced to the bypass line. The output of the detector was monitored and when the output showed a plateau, the flow stream was switched to the chromatographic column to begin the separation. Further analysis showed that the chromatogram depicts an impurity 715 that eluted before the desired sample, beginning at 725.

Figure 7:
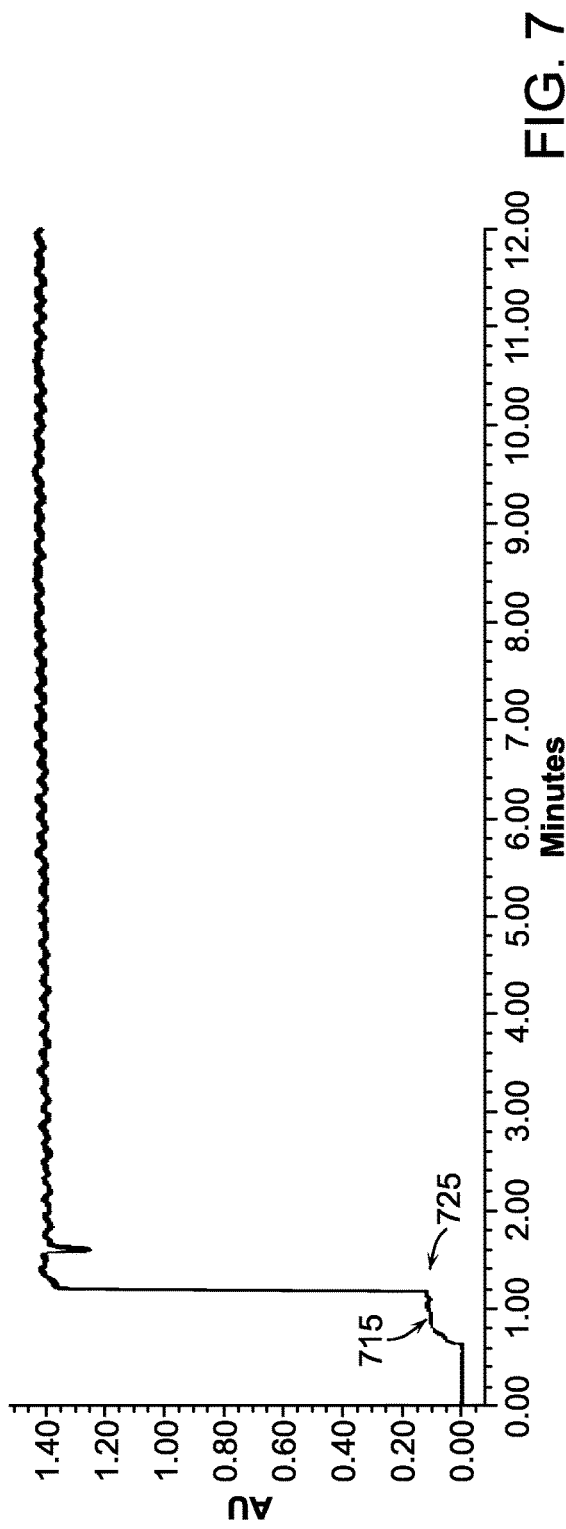
FIG. 7 shows an exemplary chromatogram featuring a non diffuse front portion.

For comparison, the experiment was repeated without the feed solution initially being directed through the bypass line. The feed solution was introduced directly to the column. FIG. 2 shows the chromatogram of the separation without the bypass operation. In FIG. 2, the sample concentration increased slowly, indicating a diffuse front. The impurity 715 of FIG. 7 is not visible in FIG. 2. It is believed that the impurity co-eluted with the diffuse portion of the sample. The difference in the time scale of the two separations results from the time required for the sample to begin to load the column.

For the purposes of Example 1, a plateau was determined from the chromatogram obtained in the separation. For the chromatogram shown in FIG. 2, where the front was extremely diffuse, the onset of the plateau was obtained by first determining the final value of the absorbance signal (1.46 AU). Then, taking 99% of that value (1.45 AU) to account for 1% variation. Then the time corresponding to that signal was determined to be the onset of the plateau. To obtain the onset of the plateau for the chromatogram shown in FIG. 7, the sharp front demonstrated by the chromatogram was taken as the onset of the plateau.

While this disclosure has been particularly shown and described with reference to the foregoing example thereof, it will be understood by those skilled in the art that various changes in form and details may be made therein without departing from the scope of the invention encompassed by the appended claims.

What is claimed is:

1. A chromatography method, the method comprising:
    directing a flow of a feed solution through a bypass line to a detector to divert a diffuse portion of the feed solution from flowing through a chromatography column, the feed solution comprising mobile phase and sample;
    observing an output of the detector, wherein the output indicates whether the sample is present in a non-diffuse concentration; and directing the flow of the feed solution through the chromatography column when the output indicates the non-diffuse concentration.

2. The method of claim 1, wherein the output indicates that the sample is present in the non-diffuse concentration when the output reaches a plateau.

3. The method of claim 1, wherein the bypass line is a zero volume connector.

4. The method of claim 1, further comprising directing the flow from the chromatography column to the detector after the flow of the feed solution is directed to the chromatography column.

5. The method of claim 1, further comprising recycling a portion of the feed solution passing through the detector, wherein at least one of the mobile phase and the sample from the portion are recovered for use in a new portion of the feed solution.

6. The method of claim 1, wherein the chromatography method is on-off chromatography.

7. The method of claim 1, wherein the mobile phase comprises carbon dioxide.

8. The method of claim 1, wherein the mobile phase comprises a compressible fluid and a co-solvent.

9. A chromatography method, the method comprising:
measuring the concentration of a sample in a feed solution to identify a non-diffuse portion of the feed solution, wherein the non-diffuse portion has a concentration that is non-zero and approximately constant as compared to a remainder portion of the feed solution; and
directing the non-diffuse portion of the feed solution to a chromatography column.

10. A chromatography system comprising:
a mobile phase and sample flow stream;
a valve downstream of the flow stream, wherein the valve is capable of changeably establishing a fluid path through either a chromatography column or a bypass line;
a first detector in fluid communication with the bypass line and a second detector in fluid communication with the chromatography column; and
a controller, wherein the controller receives the output of the first detector and controllably actuates the valve.

11. The chromatography system of claim 10, wherein the controller is capable of identifying when the output of the first detector reaches a plateau and thereupon actuating the valve to direct the feed solution flow to the chromatography column.

12. The chromatography system of claim 10, wherein the controller is capable of using the output of the first detector to actuate the valve so as to provide diffuse portions of a sample band to the bypass line and non-diffuse portions of a sample band to the chromatography column.

13. The chromatography system of claim 10, wherein the first detector and the second detector are the same detector.

14. The chromatography system of claim 10, wherein the first detector is selected from the group consisting of UV/VIS detectors, RI detectors, conductivity monitors, and combinations thereof.

15. The chromatography system of claim 10, wherein the mobile phase comprises carbon dioxide and a co-solvent, the system further comprising a mixer in fluid communication with the flow stream, a carbon dioxide source in fluid communication with the mixer, a co-solvent source in fluid communication with the mixer and a co-solvent and sample source in fluid communication with the mixer.

16. The chromatography system of claim 15, further comprising a second valve upstream of the mixer, wherein the second valve is capable of changeably establishing a fluid connection between either of the co-solvent source and the co-solvent and sample source and a pump, the pump being capable of pressurizing a flow stream from either of the co-solvent source of the co-solvent and sample source to the mixer.

17. The chromatography system of claim 15, further comprising a recovery and recycling system downstream of the first detector, wherein the system is capable of returning the sample and co-solvent to the co-solvent and sample source.

18. The chromatography system of claim 10, wherein the bypass line is a zero volume connector.

19. The chromatography system of claim 15, wherein the co-solvent is selected from the group consisting of methanol, ethanol, isopropanol, acetonitrile, acetone, tetrahydrofuran, and mixtures thereof.

* * * * *